United States Patent
Haft

Patent Number: 5,193,500
Date of Patent: Mar. 16, 1993

[54] OILING SYSTEM FOR INTERNAL COMBUSTION ENGINE

[75] Inventor: Gerald Haft, Brookfield, Wis.

[73] Assignee: Outboard Marine Corporation, Waukegan, Ill.

[21] Appl. No.: 654,088

[22] Filed: Feb. 11, 1991

[51] Int. Cl.$^5$ ............................................. F01M 1/18
[52] U.S. Cl. .................... 123/196 CP; 123/196 S; 123/74 AE
[58] Field of Search ........ 123/196 R, 196 W, 73 AD, 123/73 SC, 74 AE, 196 CP; 184/6.5

[56] References Cited

U.S. PATENT DOCUMENTS

| | | | |
|---|---|---|---|
| 2,263,414 | 11/1941 | Beneshek et al. | 123/196 R |
| 2,333,524 | 11/1943 | Conover et al. | 123/196 CP |
| 2,983,334 | 5/1961 | Dalrymple | 184/6 |
| 3,144,095 | 8/1964 | Trapp et al. | 184/6 |
| 3,722,623 | 3/1973 | Waldecker | 123/196 S |
| 3,949,725 | 4/1976 | Jaulmes | 123/196 R |
| 3,961,614 | 6/1976 | Rameau | 123/195 A |
| 3,967,612 | 7/1976 | Yamada | 123/196 CP |
| 4,061,204 | 12/1977 | Kautz, Jr. | 123/196 S |
| 4,121,551 | 10/1978 | Turner | 123/196 CP |
| 4,121,559 | 10/1978 | Yamada | 123/196 R |
| 4,458,641 | 7/1984 | Wickramasuriya | 123/195 A |
| 4,458,643 | 7/1984 | Isobe et al. | 123/196 R |
| 4,513,704 | 4/1985 | Evans | 123/196 S |
| 4,777,913 | 10/1988 | Staerzl et al. | 123/73 A |
| 4,898,207 | 2/1990 | Ueki et al. | 123/196 CP |
| 4,903,654 | 2/1990 | Sato et al. | 123/196 W |
| 4,947,807 | 8/1990 | Flaig et al. | 123/55 VF |
| 4,970,996 | 11/1990 | Matsuo | 123/196 CP |
| 5,000,143 | 3/1991 | Brown | 123/196 S |
| 5,069,177 | 12/1991 | Dokonal | 123/196 S |

*Primary Examiner*—E. Rollins Cross
*Assistant Examiner*—Erick Solis
*Attorney, Agent, or Firm*—Michael, Best & Friedrich

[57] ABSTRACT

An internal combustion engine including an engine block defining first and second cylinders with first and second crankcases associated with the first and second cylinders. An oil passageway communicates with each of the crankcases and a conduit is connected to the oil passageway to supply oil to the crankcases. A check valve is located in either the oil passageway or the conduit.

9 Claims, 2 Drawing Sheets

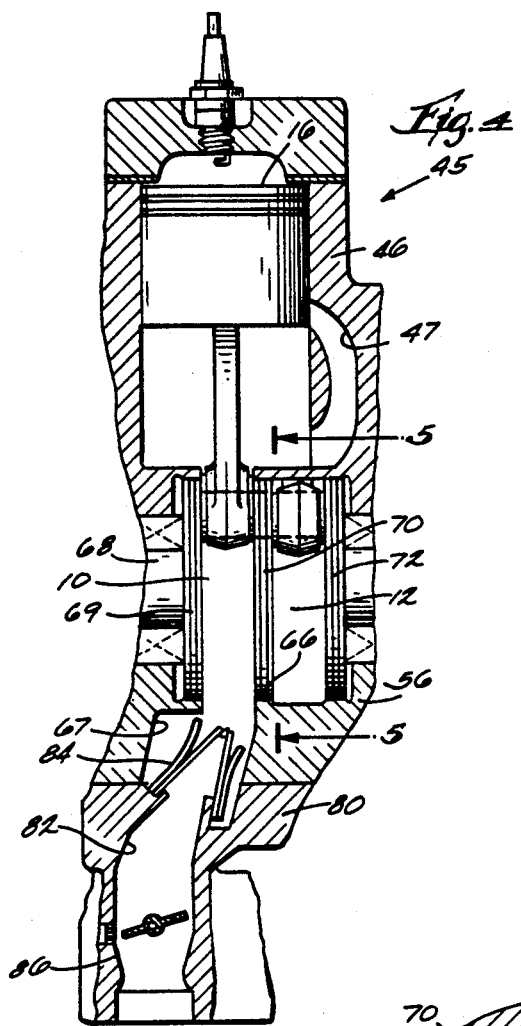
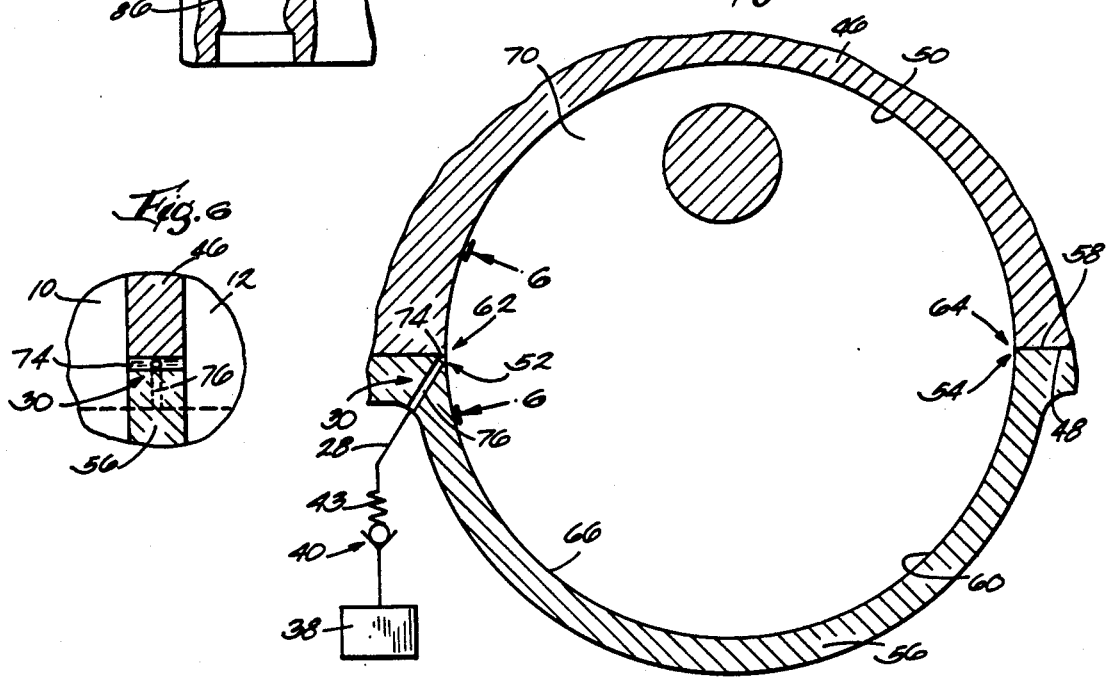

OILING SYSTEM FOR INTERNAL COMBUSTION ENGINE

BACKGROUND OF THE INVENTION

1. Field of the Invention

This invention relates to internal combustion engines, and more particularly to a system for oiling internal combustion engines.

2. Description of the Prior Art

The prior art relating to oiling systems for internal combustion engines generally discloses oiling systems whereby lubricating oil from an oil source is supplied to the crankshaft, to the connecting rod bearings and to the pistons by an arrangement comprising ah oil pump which is coupled to the end of one of the rotary shafts of the motor, generally the crankshaft, and an oil passageway leading from the oil pump and to the crankcases.

Attention is directed to the following U.S. Patents:

| Patent Number | Inventor | Issue Date |
| --- | --- | --- |
| 2,983,334 | Dalrymple | May 6, 1961 |
| 3,144,095 | Trapp et al. | August 11, 1964 |
| 3,949,725 | Jaulmes | April 13, 1976 |
| 3,961,614 | Rameau | June 8, 1976 |
| 4,121,559 | Yamada | October 24, 1978 |

SUMMARY OF THE INVENTION

The invention provides an internal combustion engine comprising an engine block defining a cylinder and a crankcase associated with the cylinder, conduit means communicating with the crankcase, means for supplying oil to the conduit means, and valve means located in the conduit means and downstream of the supplying means.

The invention also provides an internal combustion engine comprising a crankcase cover partially defining first and second crankcases and including an engine block mounting surface, and a first semicylindrical surface intersecting the engine block mounting surface to define opposed first and second corners and partially defining a sealing land which is located between the crankcases and which is adapted to sealingly engage a crankshaft disc, and an engine block partially defining the crankcases and including a crankcase cover mounting surface mating with the engine block mounting surface, and a second semicylindrical surface which intersects the crankcase cover mounting surface to define opposed third and fourth corner respectively aligned with the first and second corners and which cooperates with the first semicylindrical surface to define the sealing land, one of the corners being chamfered to provide a first passageway which communicates between the crankcases and which is defined in part by the crankcase cover and the engine block.

The invention also provides an internal combustion engine comprising an engine block partially defining first and second crankcases, a crankcase cover which is mounted on the engine block and which partially defines the crankcases, a crankshaft which is rotatably supported by the engine block and the crankcase cover and which includes a crankshaft disc located between the crankcases, and means including the crankshaft disc and at least one of the crankcase cover and the engine block for defining a oil passageway communicating between the crankcases.

A disadvantage of known oiling systems includes the problem of negative pressure being created in the oil passageway due to low crankcase pressure, which negative pressure will draw oil through the oil pump resulting in excess oil being delivered to the engine. Another disadvantage of this type of oiling system is that positive pressure in the crankcase may cause oil to leak down the passageway back to the oil pump.

A principal feature of the invention is the provision of a spring-loaded valve located in the conduit means. This valve means will help prevent excess oil from being delivered to the engine as a result of low crankcase pressure. This valve will also help prevent positive crankcase pressure from causing oil to leak down the oil passageway back to the oil pump.

Another feature of the invention is the provision of an oil passageway which communicates between crankcases and which is defined by a crankshaft disc and one or both of the crankcase cover and the engine block.

Other principal features and advantages of the invention will become apparent to those skilled in the art upon review of the following detailed description, claims and drawings.

BRIEF DESCRIPTION OF THE DRAWINGS

FIG. 4 is a sectional view of a second alternative embodiment of the invention.

FIG. 5 is a view taken along line 5—5 in FIG. 4.

FIG. 6 is a view taken along line 6—6 in FIG. 5.

Figure 1:
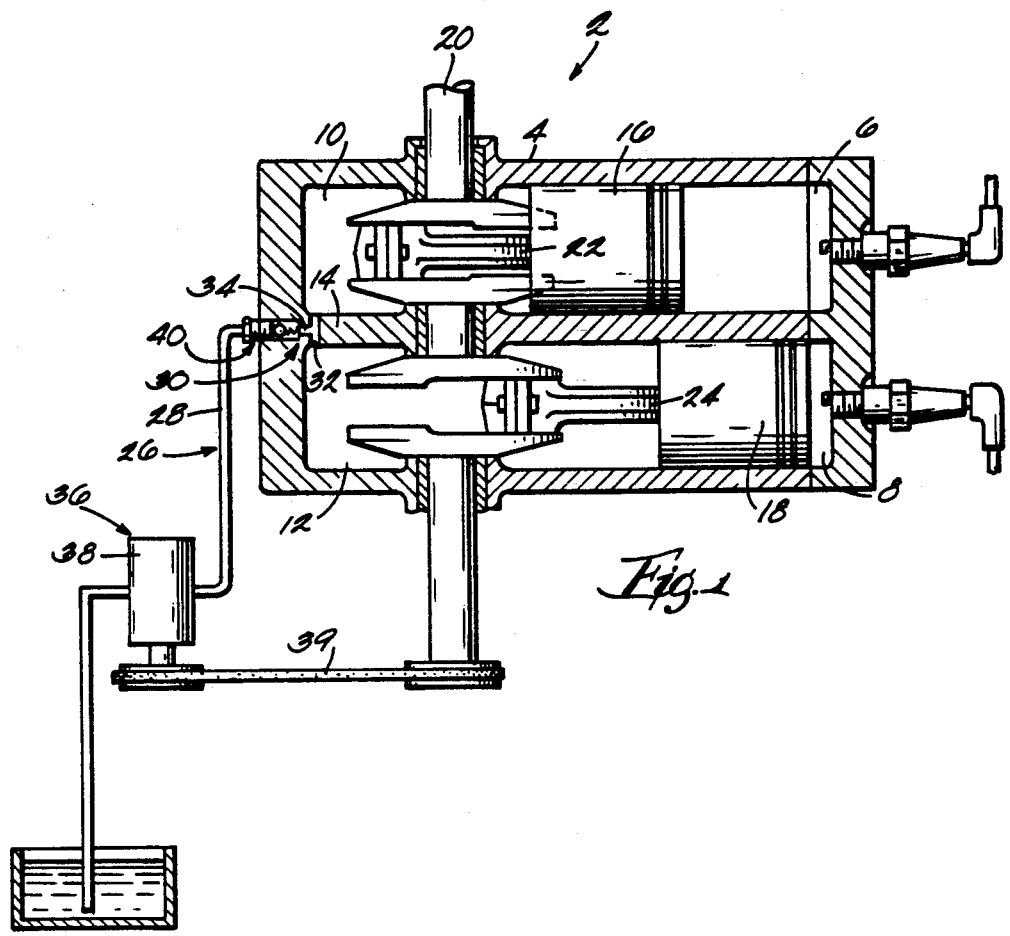
FIG. 1 is a sectional view of an internal combustion engine embodying the invention.

Before one embodiment of the invention is explained in detail, it is to be understood that the invention is not limited in its application to the details of construction and the arrangement of components set forth in the following description or illustrated in the drawings. The invention is capable of the other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

An internal combustion engine 2 embodying the invention is illustrated in FIG. 1. The engine 2 is a two-cycle engine and includes an engine block 4 which defines first and second cylinders 6 and 8 and first and second crankcases 10 and 12 respectively associated with the first and second cylinders 6 and 8. The engine block 4 further includes a wall 14 which separates the crankcases 10 and 12.

First and second pistons 16 and 18 are respectively located in the first and second cylinders 6 and 8. A crankshaft 20 is rotatably supported by the engine block 4 and extends through the crankcases 10 and 12. The pistons 16 and 18 are operatively connected to the crankshaft 20 by connecting rods 22 and 24.

Figure 2:
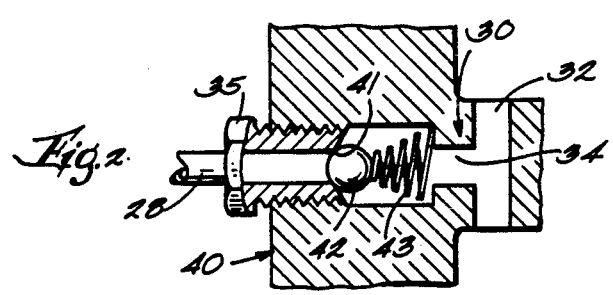
FIG. 2 is an enlarged, sectional view of a portion of the engine shown in FIG. 1.

Lubricating oil is supplied to the engine, and particularly to the crankshaft 20, the pistons 16 and 18, and the connecting rod bearings (not shown), by an oiling system including conduit means 26 communicating with each of the crankcases 10 and 12. The conduit means 26 includes a conduit 28 and an oil passageway 30 located in and defined by the engine block 4. The oil passageway 30 comprises (see FIG. 2) a first bore 32 communicating between the crankcases 10 and 12, and a second bore 34 having a first or right end communicating with the first bore 32 and a second or left end communicating with the conduit 28 via a fitting 35. The first bore 32 has a midpoint between the crankcases 10 and 12, and the second bore 34 intersects the first bore 32 at its midpoint.

The oiling system further includes means 36 for supplying oil to the conduit means 26. While various suitable means can be employed, the supplying means 36 is preferably an oil pump 38 connected to the oil passageway 30 by the conduit 28. The oil pump 38 is driven by the crankshaft 20 through a drive belt 39 and is constructed to deliver oil through the conduit means 26 in relation to the rotation of the crankshaft 20.

The entry of oil into the crankcases 10 and 12 is governed by the movement of the pistons 16 and 18. The pistons 16 and 18 always travel in opposite directions. Thus, when one of the pistons is moving "upward" (to the right in FIG. 1) and creating a negative pressure in its crankcase and its connected portion of the oil passageway, the other piston is moving "downward" and creating a positive pressure in its crankcase and its connected portion of the oil passageway. The pressure differential between the crankcases directs the oil to the crankcase that is at the lower pressure.

The oiling system also includes (see FIG. 2) valve means 40 located in the oil passageway 30 and downstream of the oil pump 38. This valve means 40 is preferably a spring-loaded check valve operable so as to permit oil flow to the crankcases 10 and 12 in response to positive pressure from the pump 38, to prevent oil flow to the crankcases 10 and 12 in response to negative pressure from the crankcases 10 and 12, and to prevent oil flow to the oil pump 38. The check valve 40 includes a valve seat 41 defined by the fitting 35, and a valve member or ball 42 biased against the seat by a spring 43. The force of the spring 43 is enough to prevent the ball 42 from being unseated by negative pressure in the bore 32. Although the valve means 40 is illustrated as being in the second bore 34 in FIGS. 1 and 2, the valve means 40 may also be located in the conduit 28.

The valve means will function to substantially prevent excess oil from possibly being delivered to the engine when a low crankcase pressure may cause oil to be drawn from the oil pump 38 to the engine 2. The valve means 40 will also function to substantially prevent positive crankcase pressure from possibly causing oil to leak down the oil passageway 30 back to the oil pump 38.

The engine 2 also comprises intake passages (not shown) communicating between the crankcases 10 and 12 and the cylinders 6 and 8, and suitable means such as carburetors (not shown) for supplying air/fuel mixture to the crankcases 10 and 12. Thus, the above-described conduit means, oil supplying means and valve means are independent of the means for supplying air to the crankcases 10 and 12.

Figure 3:
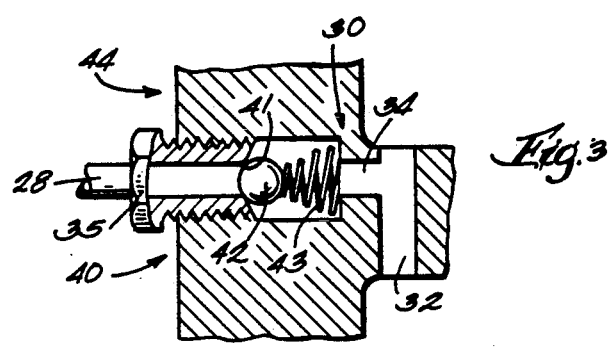
FIG. 3 is a view similar to FIG. 2 of an alternative embodiment of the invention.

An engine 44 that is an alternate embodiment of the invention is illustrated in FIG. 3. Except as explained below, the engine 44 shown in FIG. 3 is substantially identical to the engine 2 shown in FIGS. 1 and 2, and common elements have been given the same reference numerals.

In the engine 44, the second bore 34 intersects the first bore 32 at a point spaced from the midpoint of the first bore 32. Specifically, the second bore 34 intersects the first bore 32 above the midpoint of the first bore 32. This location of the second bore 34 compensates for the effect of gravity on oil flowing into the first bore 32. Gravity could, in the absence of this location of the bore 34, cause more oil to flow to the lower crankcase 12.

An engine 45 that is a second alternative embodiment of the invention is shown in FIGS. 4–6. Except as identified below, the engine 45 illustrated in FIGS. 4–6 is substantially the same as the engine 2 illustrated in FIGS. 1 and 2, and like elements have been given like numerals.

The engine 45 comprises a V-type engine block 46 partially defining first and second crankcases 10 and 12 and including a crankcase cover mounting surface 48 (see FIG. 5). FIG. 4 is a sectional view through one of the cylinder banks of the engine 45. The engine block 46 also includes a semicylindrical surface 50 intersecting the crankcase cover mounting surface 48 to define opposed corners 52 and 54. The engine block 46 also defines (see FIG. 4) an intake passage 47 communicating between the crankcase 10 and the cylinder 16. Similar intake passages (not shown) communicate between the other crankcases and their respective cylinders.

The internal combustion engine 45 also includes a crankcase cover 56 mounted on the engine block 46. The crankcase cover 56 partially defines the crankcases 10 and 12 and includes (see FIG. 5) an engine block mounting surface 58. The engine block mounting surface 58 mates with the crankcase cover mounting surface 48 of the engine block 46. The crankcase cover 56 also includes a semicylindrical surface 60 intersecting the engine block mounting surface 58 to define corners 62 and 64 respectively aligned with the corners 52 and 54. The surface 60 cooperates with the surface 50 to define a sealing land 66. The crankcase cover 56 also includes (see FIG. 4) a plurality of fuel/air inlets 67 communicating with the respective crankcases. Only the inlet 67 communicating with the crankcase 10 is shown in FIG. 4.

The internal combustion engine 45 further includes a crankshaft 68 which is rotatably supported by the engine block 46 and the crankcase cover 48 and which includes crankshaft discs 69, 70 and 72. Discs 69 and 70 cooperate with the engine block 46 and the crankcase cover 56 to define the crankcase 10. Disc 70 sealingly engages the sealing land 66. Discs 70 and 72 cooperate with the engine block 46 and the crankcase cover 56 to define the crankcase 12.

Means including the crankshaft disc 70, the crankcase cover 56 and engine block 46 are provided for defining an oil passageway 74 communicating between the crankcases 10 and 12. More specifically, the corner 62 is chamfered to provide the passageway 74 which communicates between the crankcases and which is defined in part by the disc 70, the crankcase cover 56 and the engine block 46. The crankcase cover 56 includes a passageway 76 communicating with the passageway 74.

The internal combustion engine 45 further includes means (shown schematically in FIG. 5) for supplying oil to the oil passageway 76. This supplying means preferably includes the oil pump 38, the conduit 28, and the spring-loaded valve 40. The valve may be located either inside the crankcase cover 56 or outside of the crankcase cover 56.

In alternative embodiments (not shown), any one or either aligned pair of the corners 52, 54, 62 and 64 could be chamfered to provide a passageway between the crankcases 10 and 12.

The engine 45 further comprises means for supplying a fuel/air mixture to the crankcases. Such means preferably include (see FIG. 4) an intake manifold 80 which is mounted on the crankcase cover 56 and which has therein a plurality of intake passages 82 (only one is shown) communicating with respective inlets 67 in the crankcase cover 56. Each passage 82 has therein a conventional reed valve 84. The fuel/air supplying means also includes a plurality of carburetors 86 (only one is shown) communicating with respective intake passages 82.

The operation of the oiling system in this alternative embodiment is similar to the operation of the oiling system previously described and will not be described in great detail. Briefly, oil will travel through the conduit 28, into the oil passageway 76, and will enter the crankcases 10 and 12 through the oil passageway 74. The entry of oil into the crankcases is governed by the movement of the pistons 16 and 18.

Various features of the invention are set forth in the following claims.

What is claimed is:

1. A two-stroke internal combustion engine comprising an engine block defining a cylinder and at least partially defining a crankcase associated with said cylinder, conduit means communicating with said crankcase, a pump exterior to said crankcase for pumping oil to said conduit means, and normally closed valve means located in said conduit means and downstream of said pump, said valve means normally preventing flow relative thereto and opening in response to operation of said oil pump.

2. A two-stroke internal combustion engine comprising an engine block defining a cylinder and at least partially defining a crankcase associated with said cylinder, an oil passageway communicating with said crankcase, an oil pump for pumping oil to said oil passageway, and valve means located in said passageway and downstream of said oil pump, said valve means permitting oil flow to said crankcase in response to positive pressure from said pump, and preventing oil flow from said crankcase to said oil pump.

3. The internal combustion engine of claim 2 wherein said oil passageway includes a part located in said engine block and a conduit connecting said oil pump to said part of said oil passageway.

4. The internal combustion engine of claim 3 wherein said valve means is in said conduit.

5. The internal combustion engine of claim 2 wherein said valve means includes a spring-loaded valve.

6. An internal combustion engine comprising an engine block defining a first cylinder and a first crankcase associated with said cylinder, a second cylinder and a second crankcase associated with said second cylinder, an oil passageway communicating with both of said crankcases and comprising a first bore communicating between said crankcases, and a second bore having a first end communicating with said first bore and a second end, a conduit connected to said second end of said bore, an oil pump for pumping oil to said conduit, and valve means located in one of said conduit and said second bore and downstream of said oil pump.

7. The internal combustion engine of claim 6 wherein said first bore has a midpoint between said crankcases, and wherein said second bore intersects said first bore at said midpoint.

8. The internal combustion engine of claim 6 wherein said first bore has a midpoint between said crankcases, and wherein said second bore intersects said first bore at a point spaced from said midpoint.

9. The internal combustion engine of claim 6 wherein said valve means is in said second bore.

* * * * *